3,147,671
HYDRAULIC ACTUATOR
Howard M. Geyer, Dayton, Ohio, assignor to General Motors Corporation, Detroit, Mich., a corporation of Delaware
Filed Dec. 4, 1962, Ser. No. 242,275
2 Claims. (Cl. 91—422)

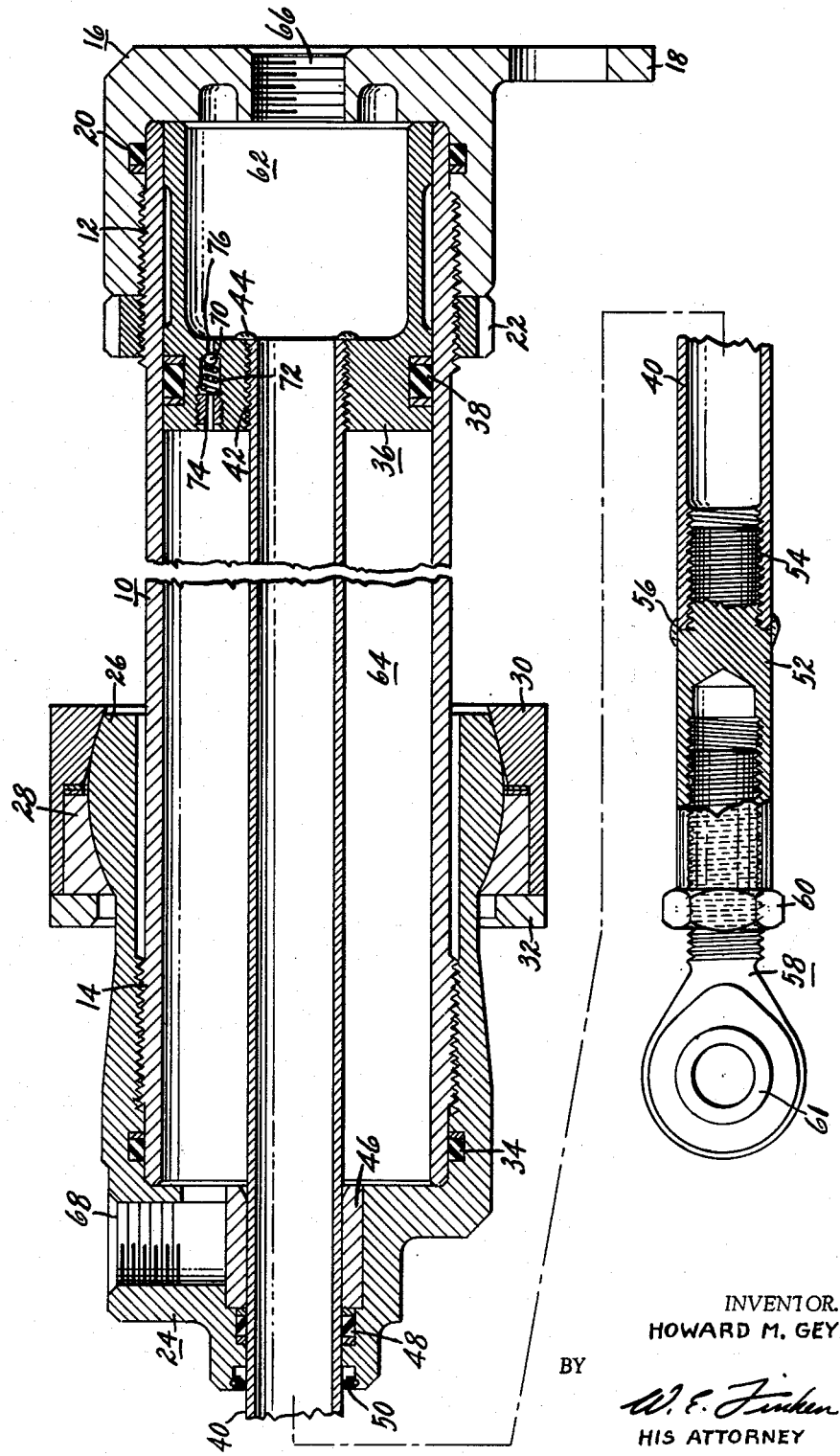
Sept. 8, 1964     H. M. GEYER     3,147,671
HYDRAULIC ACTUATOR
Filed Dec. 4, 1962
INVENTOR.
HOWARD M. GEYER
BY
HIS ATTORNEY United States Patent Office 3,147,671
Patented Sept. 8, 1964

This invention pertains to linear hydraulic actuators, and particularly to a piston and cylinder type hydraulic actuator designed for tension loads.

There are numerous applications in present day aircraft for simple, lightweight hydraulically operated linear actuators of the piston and cylinder type wherein the actuator is subjected primarily to tension loads. For example, the cargo ramps of transport aircraft are operated by actuators, and the load imposed upon the actuators by a cargo ramp is unidirectional, and thus can be raised and lowered by an actuator designed for tension loads. The present invention relates to an extremely lightweight, simplified linear hydraulic actuator designed for aircraft use. Accordingly, among my objects are the provision of a lightweight, hydraulically operated actuator of the piston and cylinder type designed for tension loads; the further provision of a linear actuator of the piston and cylinder type including an elongate hollow piston rod and means for preventing buckling of the piston rod due to hydraulic pressure loading in one direction; and the still further provision of a linear hydraulic actuator designed for tension loads and having a hollow piston rod wherein the column load on the piston rod imposed by hydraulic pressure is limited to the effective area of the piston rod.

The aforementioned and other objects are accomplished in the present invention by embodying a one-way flow path through the piston head which permits free flow of hydraulic fluid between the two actuator chambers in one direction only such that during extending movement of the actuator the column load on the hollow piston rod is limited to the hydraulic pressure exerted on the effective area of the piston rod. Specifically, the weight of the actuator is kept at a minimum by utilizing a relatively thin elongate hollow piston rod having the requisite strength for supporting the normal tension load to which it is subjected. The compression load on the hollow piston rod is limited by pressure equalization of the opposed actuator chambers through a piston head passage controlled by a one-way check valve so as to prevent collapsing of the hollow rod due to hydraulic pressure acting in a direction to assist the normal tension load.

Further objects and advantages of the present invention will be apparent from the following description, reference being made to the accompanying drawing wherein a preferred embodiment of the present invention is clearly shown.

In the drawing:

The drawing depicts a fragmentary view, partly in section and partly in elevation, of an actuator constructed according to the present invention.

Referring to the drawing, the actuator comprises a cylinder tube 10 having externally threaded ends 12 and 14. A head cap 16 is threadedly connected to one end of the cylinder tube 10, the head cap having an integral radially extending mounting bracket 18 and carrying an O-ring seal 20 for engagement with the outer periphery of the cylinder tube 10. The head end cap 16 is secured in assembled relation with the cylinder tube 10 by a nut 22 which engages the threads 12.

The rod end of the cylinder tube 10 is closed by a rod end cap 24 having a set of threads engaging the threads 14 and an integral spherical mounting surface 26. The spherical mounting surface 26 coacts with a spherical bearing surface 28 confined between a housing 30 and the retainer 32 which are suitably secured together. The housing 30 is adapted for attachment to a fixed support, the mating spherical parts 26 and 28 provide a swivel joint which facilitates limited universal movement throughout an angle of at least 7° in any direction. The rod end cap 24 likewise carries an O-ring seal 34 which engages the outer periphery of the cylinder 10.

A piston head 36 is mounted for reciprocation within the cylinder tube 10, the piston head carrying a suitable O-ring seal 38 which engages the inner periphery of the cylinder tube. An elongate, thin-walled hollow piston rod 40 is both threaded at 42 and welded at 44 to the piston head 36. The piston rod extends through a bushing 46 carried by the rod end cap 24, an O-ring seal 48 and a lip-type seal 50. The outer end of the hollow piston rod 40 is closed by a plug 52 having a threaded connection 54 with the rod 40 and a weld joint at 56. A rod 58 threadedly engages the plug 52 and is held in adjusted position therewith by a nut 60, the rod 58 having a suitable fitting 61 for attachment to the load device, not shown.

The piston head 36 divides the actuator cylinder, formed by the cylinder tube 10 and the end caps 16 and 24, into an extend chamber 62 and a retract chamber 64. The area of the piston exposed to the extend chamber 62 is greater than the piston area exposed to the retract chamber 64. The extend chamber 62 communicates with a port 66 in the head cap 16, and the retract chamber 64 communicates with a retract port 68 in the rod end cap. The ports 66 and 68 may be connected to a conventional four-way valve. In addition, the piston head 36 carries a spring biased one-way check valve comprising a ball 70, a coil spring 72 and a hollow threaded plug 74, the ball valve 70 normally closing passage 76 through the piston head. As seen in the drawings, the piston passage 76 is located radially outward of the piston rod 40. It is apparent that when the retract chamber 64 is pressurized, the ball valve 70 will remain closed, but when the extend chamber 62 is pressurized the ball valve 70 will open the passage 76 thus allowing free flow of hydraulic fluid from the extend chamber 62 to the retract chamber 64 so that the pressure potentials in these chambers tend to be equalized.

By embodying a one-way check valve in the piston head, a much smaller piston rod can be used to support the normal tension load, inasmuch as the check valve limits the column, or compression, load on the piston rod to that of the effective area of the piston rod when the extend chamber 62 is pressurized. It is in this manner that the over-all weight of the actuator can be substantially reduced and yet provide a structure which is capable of raising and lowering a substantial load which normally acts in one direction, namely the direction imposing a tension load on the piston rod 40.

In operation, the actuator is shown fully retracted in the drawing. When it is desired to extend the actuator, i.e., move the piston in a direction aided by the tension load, the extend chamber 62 is pressurized and the retract chamber 64 is connected to drain. Pressurization of the extend chamber 62 will open the ball check valve 70 to allow free flow between the extend chamber and the retract chamber so that the pressures tend to be equalized. The effective area of the piston upon which the extend pressure then acts is the area of the piston rod, thus limiting the column, or compression, load on the piston rod so as to preclude buckling thereof. On the other hand, when it is desired to retract the actuator, i.e, move the piston in a direction opposed by the tension load, the retract chamber 64 is pressurized and the extend chamber is connected to drain. The ball check valve 70 remains closed at this time so that the pressure in the retract chamber acts on an effective area of the piston head minus the area of the piston rod, but since this only imposes a tension load on the hollow piston rod there is no danger of collapsing the piston rod and hence the piston and piston rod will move towards the end cap 16 to retract the load.

While the embodiment of the invention as herein disclosed constitutes a preferred form, it is to be understood that other forms might be adopted.

What is claimed is as follows:

1. A linear hydraulic actuator subject to tension loads including, a cylinder, a reciprocable piston disposed in said cylinder and dividing said cylinder into opposed chambers, an elongate thin-walled hollow piston rod attached to said piston and having a closed end disposed outside of said cylinder, said piston having unequal areas exposed to said opposed chambers, passage means through said piston located radially outward of the piston rod and a spring biased one-way check valve carried by said piston and disposed in said passage means, said check valve blocking the flow of fluid through said passage means between said chambers in one direction and permitting free flow of fluid through said passage means between said chambers in the opposite direction whereby pressurization of one of said chambers will result in a tendency for pressure equalization of said chambers through said passage means so as to limit the column load on said elongate thin-walled hollow piston rod to the effective area of said piston rod.

2. A lightweight actuator assembly designed for tension loads including, a cylinder, a reciprocable piston disposed in said cylinder and dividing said cylinder into opposed chambers, an elongate thin-walled hollow piston rod attached to said piston and having a closed end disposed outside of said cylinder, a passage through said piston located radially outward of the piston rod, and a one-way spring biased check valve disposed in said passage, said check valve opening said passage to interconnect said opposed chambers and limit the column load on said hollow piston rod upon pressurization of one of said chambers.

References Cited in the file of this patent

UNITED STATES PATENTS

| | | |
|---|---|---|
| 778,168 | Bramwell | Dec. 20, 1904 |
| 1,490,633 | Peters | Apr. 15, 1924 |
| 2,385,942 | Rockwell | Oct. 2, 1945 |
| 2,598,180 | Kenyon | May 27, 1952 |
| 2,746,425 | Schafer | May 22, 1956 |

FOREIGN PATENTS

| | | |
|---|---|---|
| 1,017,411 | France | Sept. 17, 1952 |
| 533,930 | Belgium | Dec. 31, 1954 |